Dec. 28, 1948. W. D. DAVIDSON 2,457,352
BRAKE DRUM ASSEMBLY
Filed Dec. 11, 1944
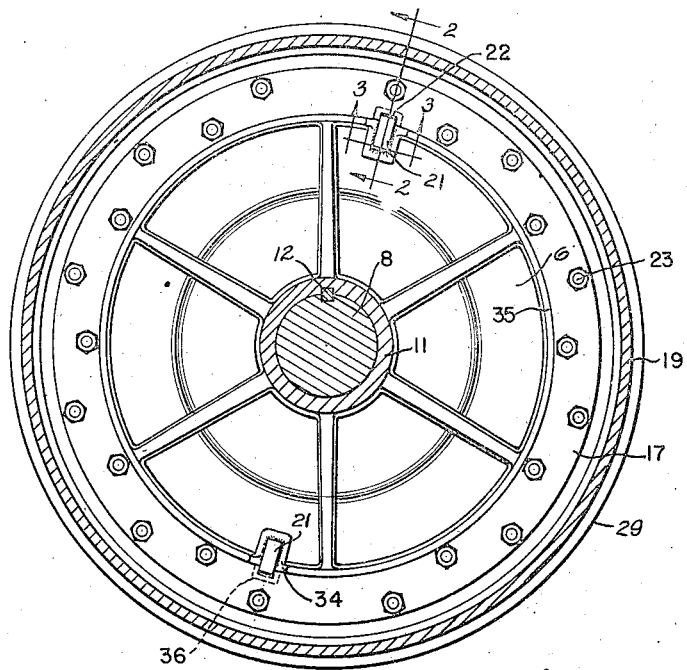
Fig. 1.
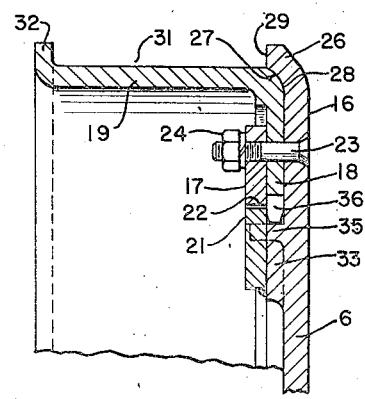
Fig. 2.
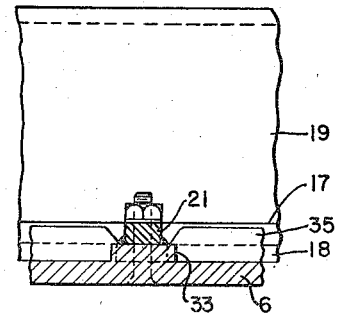
Fig. 3.
Inventor
WILLIAM D. DAVIDSON
By 
Attorney Patented Dec. 28, 1948

2,457,352

UNITED STATES PATENT OFFICE 2,457,352

BRAKE DRUM ASSEMBLY

William D. Davidson, Los Angeles, Calif., assignor to Emsco Derrick & Equipment Company, Los Angeles, Calif., a corporation of California Application December 11, 1944, Serial No. 567,553

1 Claim. (Cl. 188—218)

This invention relates to spooling and drum assemblies which are adapted to handle heavy spooling and braking loads. One of the useful applications of the invention is in the well drilling industry, wherein it is customary to employ hoisting mechanism, embodying combined braking and spooling mechanisms, for handling drill pipe. Such use imposes heavy loads on both the spooling and braking mechanisms, and the brake rims are subject to considerable wear and must be occasionally replaced.

One of the objects of the invention is to provide a combined braking and spooling assembly which is extremely rugged and has an improved capacity for handling the torque loads imposed upon it, although constructed in such a manner as to permit the brake rims to be readily removed for repair or replacement. As one aspect of this general object, the radial flange of the brake rim, by means of which the rim is detachably mounted upon a supporting wheel, is secured to the supporting wheel at a maximum radius from the axis of the assembly, so as to reduce to a minimum the torque load upon the keyed connection, in proportion to the torque load applied to the brake rim. Another feature of the invention which is directed to the accomplishment of this object, is the placement of the bolts by means of which the rim is mounted on the hub wheel, in double-shear between the rim flange, the hub wheel, and a ring which clamps the rim flange against the hub wheel, and the location of these bolts at a maximum radius from the axis of the assembly, in order to reduce the torque load thereon to a minimum.

This arrangement makes it possible to make the rim flange and the clamping ring sufficiently large in internal diameter to pass freely over the sprocket gears and clutch, through which the assembly is driven, and it is accordingly a further object of the invention to provide a braking and spooling assembly in which the rim, the rim flange, and the clamping ring are adapted to freely pass over the drive mechanism of the assembly in order to facilitate repair and replacement of the rim.

Another aspect of the invention, directed toward the general objects of providing a rugged assembly is the utilization of a single wheel member having a heavy integral hub, for supporting each end of the spooling drum and for supporting one of the brake rims.

A further object of the invention is to provide a spooling and braking assembly in which the brake rim, although separable for repair and replacement purposes, is securely held against flying apart in the event it should become broken.

Further objects and advantages of the invention will be brought out in the following part of the specification.

Referring to the drawings which are for illustrative purposes only,

Fig. 1 is a transverse sectional view of a brake and spooling drum assembly embodying the invention;

Fig. 2 is a detailed sectional view of the same taken on the line 2—2 of Fig. 1; and Fig. 3 is a detailed sectional view taken on the line 3—3 of Fig. 1.

The improved brake and spooling drum mechanism in which my invention is embodied comprises a brake wheel 6 mounted upon a shaft 8 which is adapted to be driven by any suitable means from a suitable source of power. The brake wheel 6 is provided with a heavy, one-piece hub 11 which is keyed, as at 12, to the shaft 8.

The periphery of the brake wheel 6 carries a radially extending flange 16 and a clamping ring 17 which form in effect a pair of axially spaced clamping members adapted to receive between them the radially inwardly extending flange 18 of the brake rim 19. The clamping ring 17 is separable from the brake wheel 6, but is keyed thereto by means of keys 21 secured as by welding to the wheel 6 and projecting into notches 22 in the clamping ring 17. Consequently, the bolts 23, by means of which the clamping ring 17 and the flanges 16 and 18 are secured in assembly, are under double shear in transmitting torque between the brake rim 19 and the wheel 6. That is, the bolts 23 cannot become canted under the torque load which they carry, since the opposed bolt openings in the flange 16 and clamping ring 17 are always maintained in alignment by the keyed connection between the flanges 16 and clamping ring 17, and torque loads between the flange 18 and the brake wheel will result in shearing action on both sides of the rim flange 18.

The bolts 23 are arranged in double rows as shown in Fig. 1 and the nuts 24 thereof are drawn up tightly so as to impose compressive frictional engagement between the inner faces of the flange 16 and the clamping ring 17 and the respective sides of the flange 18. The double row arrangement of the bolts produces a maximum degree of clamping engagement which resists any tendency of portions of the brake rim 19 to fly outwardly under the effect of centrifugal force in the event the rim should become split or cracked in use.

The rim is supported further against such outward movement by a dished peripheral flange 26 on the flange 16, having an inner shoulder surface 27 to snugly fit the curved shoulder surface 28 between the rim proper and the flange 18 of the rim 19. The axial end surface of the flange 26 is squared off as at 29 to form one side extremity of the channel 31 which receives the brake band (not shown). The other side of the channel 31 is defined by a radially outwardly extending flange 32 on the extremity of the rim 19.

The keys 21 are welded upon raised lugs 33 formed integrally with the brake wheel 6, and project radially outwardly through notches 34 (Fig. 1) in the axial flange 35 formed on each of the brake wheels. The flange 35 forms a piloting seat for the inner periphery of the rim flange 18, and facilitates assembly of the rim upon the brake wheel. The flange 35 also forms a piloting seat for the removable clamping ring 17, and facilitates assembly of the latter over the flange 18. The inner peripheries of the clamping ring 17 and flange 18 are thus slightly larger in diameter than the outer diameter of the flange 35, in order that they may be freely slipped thereover.

Since the keys 21 extend outwardly beyond the inner diameter of the flange 18, the latter is provided with notches 36 adapted to receive the keys 21 in order that the flange 18 may pass the keys when it is being assembled.

The inner diameters of the clamping ring 17 and flange 18 are sufficient to permit the brake rim and the clamping ring to pass over any clutches or driving gears which may be connected to shaft 8.

The employment of a relatively large internal diameter for the clamping ring 17 and the flange 18 is accompanied by arrangement of the torque transmitting bolts 23 well outward toward the outer diameter of the brake wheel 6, and also the arrangement of the keyed torque transmitting connection between the flange 16 and clamping ring 17 well away from the torque axis and relatively near the bolts 23. This reduces the torque leverage against the torque transmitting connection to a minimum, and thereby increases the torque load capacity of the brake assembly. As a result of this arrangement, it is possible, if desired, to reduce the number of keyed connections between the flange 16 and clamping ring 17 to a single connection for each of the brake drum assemblies. A further advantage of the arrangement is the reduction to a minimum of circumferential play between the flange 16 and clamping ring 17, which would permit the bolts to cant, and thereby detract from the effectiveness of the double-shear transmission of torque.

In case of breakage of the rim 19, the parts thereof will be securely held by the clamping engagement of the flange 16 and clamping ring 17 and the overhanging supporting engagement with the dished flange 26.

I claim as my invention:

A brake drum assembly comprising a brake wheel provided with a radially extending wheel flange, a circular flange integral with said wheel flange and extending axially from a side surface thereof, a brake rim having a radially inwardly extending brake flange engaging the side surface of said wheel flange and surrounding said circular flange, a clamping ring having a notched inner periphery surrounding said circular flange and engaging said brake flange, a key secured to said circular flange in spaced relationship to said side surface of said wheel flange and extending radially into a notch in the inner periphery of said clamping ring to lock said clamping ring and said wheel flange against relative rotation, and a plurality of bolts extending through said wheel flange, said brake flange and said clamping ring.

WILLIAM D. DAVIDSON.

REFERENCES CITED

The following references are of record in the file of this patent:

UNITED STATES PATENTS

| Number | Name | Date |
| --- | --- | --- |
| 1,874,574 | Morgan | Aug. 30, 1932 |
| 1,995,697 | Whitacre | Mar. 26, 1935 |
| 2,057,725 | La Brie | Oct. 20, 1936 |